April 2, 1957     K. RÄNTSCH     2,787,187
PRISM SYSTEM FOR BEAM SPLITTING
Filed April 16, 1954
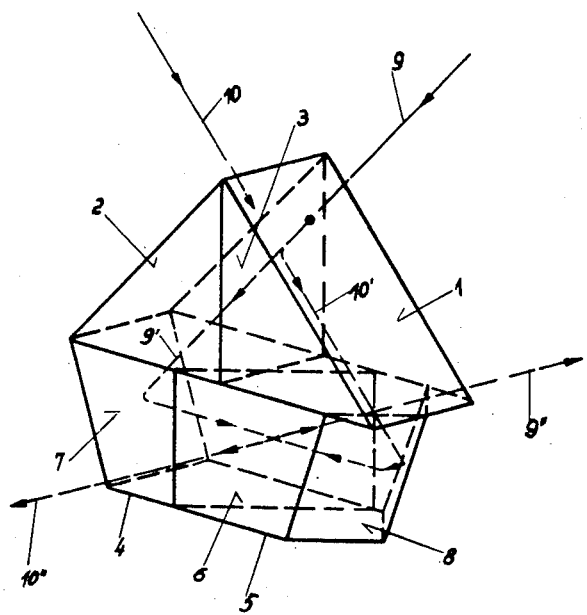

United States Patent Office 2,787,187
Patented Apr. 2, 1957

2,787,187

PRISM SYSTEM FOR BEAM SPLITTING

Kurt Räntsch, Heidenheim (Brenz), Germany, assignor to Carl Zeiss, Heidenheim (Brenz), Germany Application April 16, 1954, Serial No. 423,789

Claims priority, application Germany April 25, 1953

4 Claims. (Cl. 88—1)

It frequently is necessary in the construction of optical instruments to superpose the light beams proceeding from two images and ensuingly separate them in order to be able to binocularly observe the superposed images. Such a superposing and separation can be effected by a semipermeable reflector, in that one assumes as plane of incidence of the light beams a plane perpendicular to the semipermeable reflector and allows the light beams to fall on this from both sides at an angle of 45° to the reflector normal. In the known arrangements of this kind the deflection of the thus separated and superposed light beams into two oculars provided for the binocular observation was effected through a series of prisms. If the further requirement was made, that the ocular could be swung about an axis normal to the optical axis of the oculars, then one so deflected the superposed and separated light beams through the provided prisms that in leaving this arrangement they were directed in opposite directions. In the paths of the so directed light beams Porro prisms and further deflecting reflectors could then be mounted, which conducted the light beams to the oculars. Then the Porro prisms and the oculars could be swung about an axis coinciding with the direction of the oppositely directed light beams without impairing the position of the image.

In the known arrangements the expenditure of prisms or reflectors for solving this problem was very great and the arrangements correspondingly occupied much space. The invention now eliminates these defects in that the prism and reflector arrangement for superposition and separation, as well as for deflection of the light beams in opposite directions is replaced by a prism system which is characterized in that in its interior are arranged a semipermeable and a double-sided reflecting surface and that at least two outer surfaces of the prism system are developed as reflecting surfaces, in such fashion, that two of the light beams departing from the semipermeable reflecting surface are directed by the reflecting outer surfaces of the prism system each on one side of the double-sided reflecting layer and these light beams after reflection at this reflecting layer leave the prism in opposite directions. If one allows the light to fall under the above specified conditions into the prism system and on the semipermeable reflecting layer, then the prism system meets the given demands in simplest manner. The prism system is advantageously constructed of two right-angled prisms and two other prisms and the semipermeable reflecting layer is located in the contact surface of the right-angled prisms and the double-sided reflecting layer in the contact surface of the two other prisms. The two other prisms then are so joined to the right-angled prisms, that the light beams coming from the semipermeable reflecting layer fall at an angle of 45° on the double-sided reflecting layer. The reflecting outer surfaces of the prism system assume such a position towards the semipermeable and towards the double-sided reflecting layers, that the light beams coming from the semipermeable reflecting layer in perpendicular direction to the semipermeable reflecting layer are directed onto the double-sided reflecting layer. Two surfaces of the mentioned other two prisms lying opposite the double-sided reflecting layer can serve as reflecting outer surfaces of the prism system. In order that the superposed images in the two oculars appear equal, it is suitable to develop one reflecting outer surface as an optical square.

In the drawing an execution example of the object of the invention is represented.

Two isosceles right-angled prisms 1 and 2 are cemented each with a cathetus surface to a semipermeable beam-splitting reflector 3. Two prisms 4 and 5 are attached to the other cathetus surfaces of the right-angled prisms 1 and 2. The prisms 4 and 5 are joined each with one surface to a double-sided reflector 6, in such manner that this reflector lies in the direction of the semipermeable reflector 3 but rotated by 45° against this. The sides 7 and 8 lying opposite these surfaces are developed as reflectors so that the light beams coming from the beam-splitting reflector are deflected by these reflectors perpendicular to the beam-splitting reflector. Reflector 8 is developed as an optical square.

The mode of action of the prism system is as follows.

Two beams of light 9 and 10 falling on the beam-splitting reflector 3 are split by this each in half and superposed in the light beams 9' and 10'. The light beam 9' is reflected at the reflectors 7 and 6 and leaves the prism 4 in the direction 9''. The light beam 10' falls on the optical square 8 and the reflector 6 and leaves prism 5 in the direction 10''.

I claim:

1. Prism system for superposing two light beams and splitting said beams into two parts and directing said parts in opposite directions having in combination four prisms, two of them being cemented together to form a first pair and the other two prisms being cemented together to form a second pair, both pairs of prisms being cemented together to form a block, a semipermeable reflecting surface arranged between the two cemented prisms of the first pair, a double-sided reflecting surface impervious to light arranged between the two cemented prisms of the second pair, each pair of prisms having outer surfaces, two of the outer surfaces of the first pair of prisms being arranged at 45° to the semipermeable reflecting surface, one of them being arranged on the one side of the semipermeable reflecting surface and the other on the other side of said semipermeable reflecting surface so that the light beam entering the one outer surface impinges on the one side of the semipermeable reflecting surface and the light beam entering the other outer surface impinges on the other side of the semipermeable reflecting surface, two of the outer surfaces of the second pair of prisms being outer reflecting surfaces, one of them being arranged on the one side of the double-sided reflecting surface and the other being arranged on the other side of the double-sided reflecting surface, one of said outer reflecting surfaces reflecting the light beams coming from the one side of said semipermeable reflecting surface to the one side of the double-sided reflecting surface and the other outer reflecting surface reflecting the light beams coming from the other side of the semipermeable reflecting surface to the other side of the double-sided reflecting surface, said outer reflecting surfaces being inclined to give the light beams reflected on the one outer reflecting surface a direction parallel to the direction of the light beams reflected on the other outer reflecting surface, said double-sided reflecting surface being arranged at 45° to the direction of the light beams reflected on said outer reflecting surfaces to direct said beams into opposite directions out of said prism block.

2. Prism system according to claim 1, characterized in that the two prisms of the first pair are right-angled prisms, the semipermeable reflecting surface being located in the contact surface of said prisms.

3. Prism system according to claim 1, characterized in that one of the outer reflecting surfaces forms an optical reflecting square.

4. Prism system according to claim 1, characterized in that the double-sided reflecting surface is arranged in the prolongation of the semipermeable reflecting surface but inclined against said surface at 45° about an axis lying in both surfaces.

References Cited in the file of this patent

UNITED STATES PATENTS

| | | |
|---|---|---|
| 1,752,680 | Martin et al. | Apr. 1, 1930 |
| 2,189,932 | Ball et al. | Feb. 13, 1940 |
| 2,317,988 | Forssberg | May 4, 1943 |
| 2,625,853 | Hayward | Jan. 20, 1953 |

FOREIGN PATENTS

| | | |
|---|---|---|
| 572,381 | Great Britain | Oct. 5, 1945 |